US011897429B2

(12) United States Patent
Meador et al.

(10) Patent No.: US 11,897,429 B2
(45) Date of Patent: Feb. 13, 2024

(54) INTERIOR DELIVERY BOX

(71) Applicant: GM Cruise Holdings LLC, San Francisco, CA (US)

(72) Inventors: Timothy Jon Meador, Fairfield, CA (US); Marie Ledger, San Anselmo, CA (US); Jessica Uelmen, Alameda, CA (US); Anthony Galliano, III, Seattle, WA (US); Arun A. Mathews, New Castle, WA (US); Pratik Palnitkar, Kirkland, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/895,043

(22) Filed: Aug. 24, 2022

(65) Prior Publication Data
US 2022/0402437 A1 Dec. 22, 2022

Related U.S. Application Data

(63) Continuation of application No. 16/731,628, filed on Dec. 31, 2019, now Pat. No. 11,440,478.

(51) Int. Cl.
*B60R 7/04* (2006.01)
(52) U.S. Cl.
CPC .................................. *B60R 7/043* (2013.01)

(58) Field of Classification Search
CPC ........ A47B 31/06; B60N 2/793; B60N 3/001; B60N 3/002; B60R 2011/0059; B60R 2011/0061; B60R 7/00; B60R 7/02; B60R 7/04; B60R 7/043; B60R 7/08; B60R 9/065; B62B 3/16; B64D 11/0627; B65D 21/0212; B65D 88/14
USPC .................................. 222/174, 175; 224/275
See application file for complete search history.

(56) References Cited

U.S. PATENT DOCUMENTS 5,605,389 A * 2/1997 Kelly .................... A47B 96/202
    312/351
5,833,114 A * 11/1998 Linnell .................. B65D 25/04
    220/531
2019/0352087 A1* 11/2019 Williams ................ B60R 7/043

FOREIGN PATENT DOCUMENTS

GB         1581535 A   * 12/1980  ............. A47B 31/06

* cited by examiner

*Primary Examiner* — Peter N Helvey
*Assistant Examiner* — Matthew T Theis
(74) *Attorney, Agent, or Firm* — Akona IP PC

(57) ABSTRACT

There is disclosed herein examples of a vehicle container unit that may be mounted within a vehicle. The vehicle container unit may be mounted to a seat of a vehicle and may include space for transporting items within the vehicle container unit. The vehicle container unit may mount to the seat via an anchor system of the seat.

20 Claims, 11 Drawing Sheets

INTERIOR DELIVERY BOX

PRIORITY APPLICATION

The present application is a Continuation application claiming priority to and receiving benefit from U.S. Non-Provisional application Ser. No. 16/731,628 (the '628 Application), having the same title and filed on Dec. 31, 2019. The '628 Application is hereby incorporated by reference in its entirety.

TECHNICAL FIELD

The present disclosure relates generally to vehicle transport of goods and, more specifically, to devices and methods that provide a container to be mounted within a vehicle for the transport of goods.

BACKGROUND

Vehicles have been a major mode of transportation within many societies. In addition to carrying passengers, vehicles have become a means for transporting items and delivering items. As ride-sharing companies and ride-hailing companies have grown and expanded services, passenger vehicles have become a common means for delivery of items.

BRIEF DESCRIPTION OF THE DRAWINGS

The following figures are provided with accompanying description to provide some examples for the understanding of the subject matter disclosed herein. A component may be labeled with a same reference numeral throughout the drawings to indicate that the component is the same component throughout the drawings where the same reference numeral is utilized.

DETAILED DESCRIPTION

Overview

Figure 1:
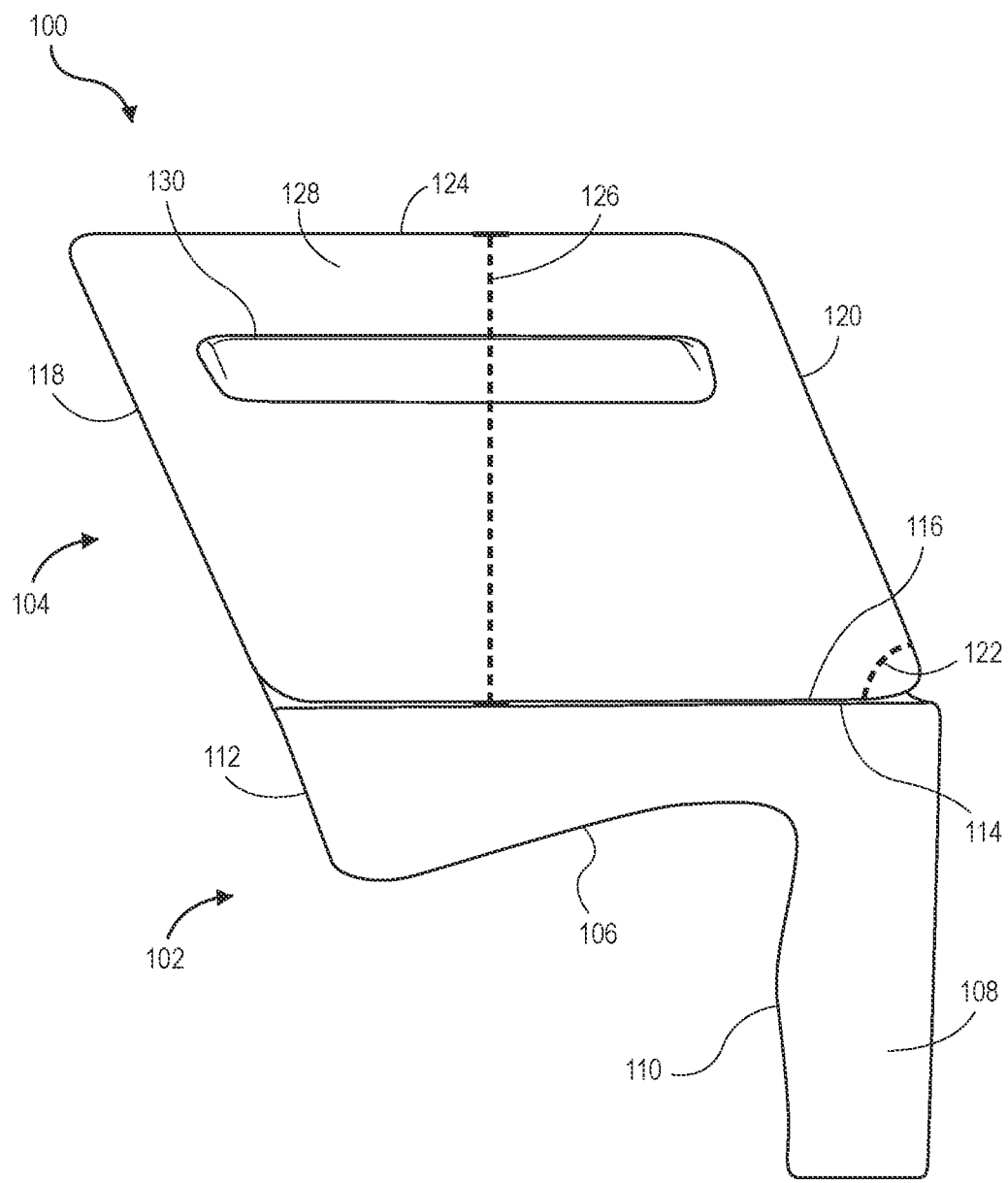
FIG. 1 provides an example vehicle container unit, according to some embodiments of the present disclosure.

The following description and accompanying drawings provide some examples illustrating features of the subject matter described herein. The present disclosure relates generally to vehicle transport of goods and, more specifically, to devices and methods that provide a container to be mounted within a vehicle for the transport of goods. As will be appreciated by one skilled in the art, features described herein may be embodied in various manners—e.g. as a method, a device, a system, and/or other manners.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Other features and advantages of the disclosure will be apparent from the following description and the claims.

DESCRIPTION

The vehicle container unit described herein may facilitate the transportation of items within a vehicle. For example, the vehicle container unit may facilitate the transportation of items on a seat of a vehicle while reducing the concerns of damage to the item or the other things within the compartment of the vehicle. The vehicle container unit may be useful in situations where items are being transported within a passenger compartment of a vehicle, as often occurs in ride-sharing situations, ride-hailing situations, and autonomous vehicles. The vehicle container unit may be utilized without having to modify the vehicle.

FIG. 1 provides an example vehicle container unit 100, according to some embodiments of the present disclosure. The vehicle container unit 100 may be utilized within a vehicle for transportation of items. In particular, the vehicle container unit 100 may have a space enclosed within the vehicle container unit 100 into which items may be placed for transportation within a vehicle, as described further throughout this disclosure. In some instances, the vehicle container unit 100 may be referred to as an interior delivery box.

The vehicle container unit 100 may include a base 102 and a vehicle container 104. The base 102 may mount to a seat of a vehicle and the facilitate mounting of the vehicle container 104 within the vehicle. In particular, the vehicle container 104 may mount to the base 102, where the base 102 is to mount the vehicle container 104 to the seat and maintain a position of the vehicle container 104 when mounted. While a particular vehicle container 104 is described throughout this disclosure, it should be understood that the base 102 may be utilized for mounting other versions of vehicle containers and/or other structures to be utilized in a vehicle.

The base 102 may have a surface 106 that is to be placed on a seat to which the base 102 and the vehicle container 104 are to be mounted. The surface 106 may abut the seat and may be contoured to match a contour of the seat, or a portion thereof, such that the surface 106 may mate with the seat, or the portion thereof, when positioned on the seat. The base 102 may include an attachment element utilized for mounting the base 102 to the seat as discussed further throughout this disclosure, where the surface 106 may be maintained against the seat when the base 102 is mounted to the seat. The base 102 may further have a surface 114 onto which the vehicle container 104 is to be positioned. The surface 114 may be located on an opposite side of the base 102 from the surface 106. The surface 114 may be substantially (within 10 degrees) parallel to a plane of contact of the vehicle with a surface on which the vehicle is located, where the plane of contact may comprise an imaginary line drawn between where wheels of the vehicle contact the surface on which the vehicle is located.

The base 102 may further have a portion 108 that is to be located in front of a front edge of the seat and may extend downwards from the seat. In particular, the portion 108 may be located in a location that legs of an individual are intended to extend if the individual is properly seated in the seat. A surface 110 of the portion 108, or some portion thereof, may be to abut and extend along a front side of the seat and/or an infrastructure on which the seat is positioned in some embodiments. In these embodiments, the surface 110, or some portion thereof, may be contoured to match the contour of the front side of the seat and/or the infrastructure on which the seat is positioned, where the surface 110 may mate with the front side of the seat and/or the infrastructure when the base 102 is mounted to the seat. In some embodiments, a surface 112 of the base 102 may abut and extend along a back of the seat. In these embodiments, the surface 112 may be contoured to match the contour of the back of the seat, where the surface 112 may mate with the back of the seat when the base 102 is mounted to the seat.

The vehicle container 104 may mount to the surface 114 of the base 102. In particular, a surface 116 of the vehicle container 104 may abut the surface 114 of the base 102 and extend along the surface 114 when the vehicle container 104 is mounted to the base 102. The vehicle container 104 may include a mounting mechanism that can couple to a mounting mechanism of the base 102 to mount the vehicle container 104 to the base 102 as described further throughout this disclosure, where the surface 116 may be maintained against the surface 114 when the vehicle container 104 is mounted to the base 102.

The vehicle container 104 may have a surface 118 that is to abut the back of the seat when the base 102 and the vehicle container 104 are mounted to the seat. The surface 118 may extend at a same angle as the back of the seat, such that the surface 118 extends along the back of the seat when the vehicle container 104 is mounted. In some embodiments, the surface 118 may further be contoured to match the contour of the back of the seat, where the surface 118 may mate with the back of the seat when the vehicle container 104 is mounted to the seat.

The vehicle container 104 may further have a surface 120 located at an opposite side of the vehicle container 104 from the seat. In particular, the surface 120 may be located at an opposite side of the vehicle container 104 from the surface 118. The surface 120 may be angled toward the back of the seat in some embodiments. For example, the surface 120 may extend at an angle 122 of approximately (within 10 degrees) 67.5 degrees from the surface 116 in some embodiments. In some embodiments, the surface 120 may be approximately (within 10 degrees) parallel to the surface 118. In other embodiments, the angle 122 may be less than 67.5 degrees or greater than 67.5 degrees. The angle 122 of the surface 120 may provide for another seat in front of the seat in which the vehicle container unit 100 is mounted. In some embodiments, the angle 122 of the surface 120 may allow the other seat in front of the seat in which the vehicle container unit 100 is mounted to recline approximately (within 5 degrees) 5 degrees from a vertical position.

The vehicle container 104 may further have a surface 124 located opposite to the base 102. In particular, the surface 124 may be located at an opposite side of the vehicle container 104 from the surface 116. In some embodiments, the surface 124 may be approximately (within 10 degrees) parallel to the surface 116. The surface 124 may be located at a distance of approximately (within 10 millimeters (mm)) 393.70 mm from the surface 116 in some embodiments. Accordingly, a height 126 of the vehicle container 104 may be approximately (within 10 mm) 393.70 mm in these embodiments. In other embodiments, the height 126 of the vehicle container 104 may be less 393.70 mm or greater than 393.70 mm. The height 126 of the vehicle container 104 may allow for a driver of the vehicle to see over the vehicle container 104 out a back window of the vehicle. In other embodiments, the vehicle container 104 may extend to a ceiling of a vehicle in which the vehicle container 104 is to be positioned. In these embodiments where the vehicle container 104 extends to the ceiling, the surface 124 may abut the ceiling of the vehicle. Further, the surface 124 may be contoured to the ceiling of the vehicle in these embodiments.

The vehicle container 104 may have a door 128. The door 128 may be opened to expose a space enclosed within the vehicle container 104, the space to be utilized for transporting goods. The door 128 may include a handle 130 to facilitate opening and closing of the door 128. In some embodiments, the handle 130 and/or the door 128 may include an indication that user can interact with the handle 130. In the illustrated embodiment, the door 128 is illustrated being on a side of the vehicle container 104 that corresponds to the right side of the seat. In these embodiments, the vehicle container unit 100 may be intended to be positioned in seats toward a right side of the vehicle to have the door 128 be adjacent to a door at a right side of the vehicle. In some embodiments, the door 128 may be aligned with a window of the vehicle when positioned in the vehicle. In these embodiments where the door 128 is aligned with a window, the door 128 may be accessed through the window when open without opening a door of the vehicle and the space enclosed within the vehicle container 104 may accessible through the open window when the door 128 is opened. Accordingly, items may be retrieved and/or placed within the space within the vehicle container 104 without having to open a door of the vehicle. In other embodiments, the door 128 may be located on an opposite side of the vehicle container 104 that corresponds to the left side of the seat. In these embodiments, the vehicle container unit 100 may be intended to be positioned in seats toward a left side of the vehicle to have the door 128 be adjacent to a door at a left side of the vehicle. It should be understood that while the door 128 is described as being intended to be adjacent to a door of the car in some embodiments, the position of the door 128 relative to the door of the car should not be interpreted as limiting and the vehicle container unit 100 may be mounted in seats toward either side of the vehicle regardless of the side of the vehicle container 104 on which the door 128 is located, and the vehicle container unit 100 may be mounted to a seat with the door 128 directed to a center of the vehicle. In other embodiments, the door 128 may be located at a front of the vehicle container 104 corresponding to the surface 120, at a top of the vehicle container 104 corresponding to the surface 124, on either side of the vehicle container 104, or some combination thereof.

Figure 2:
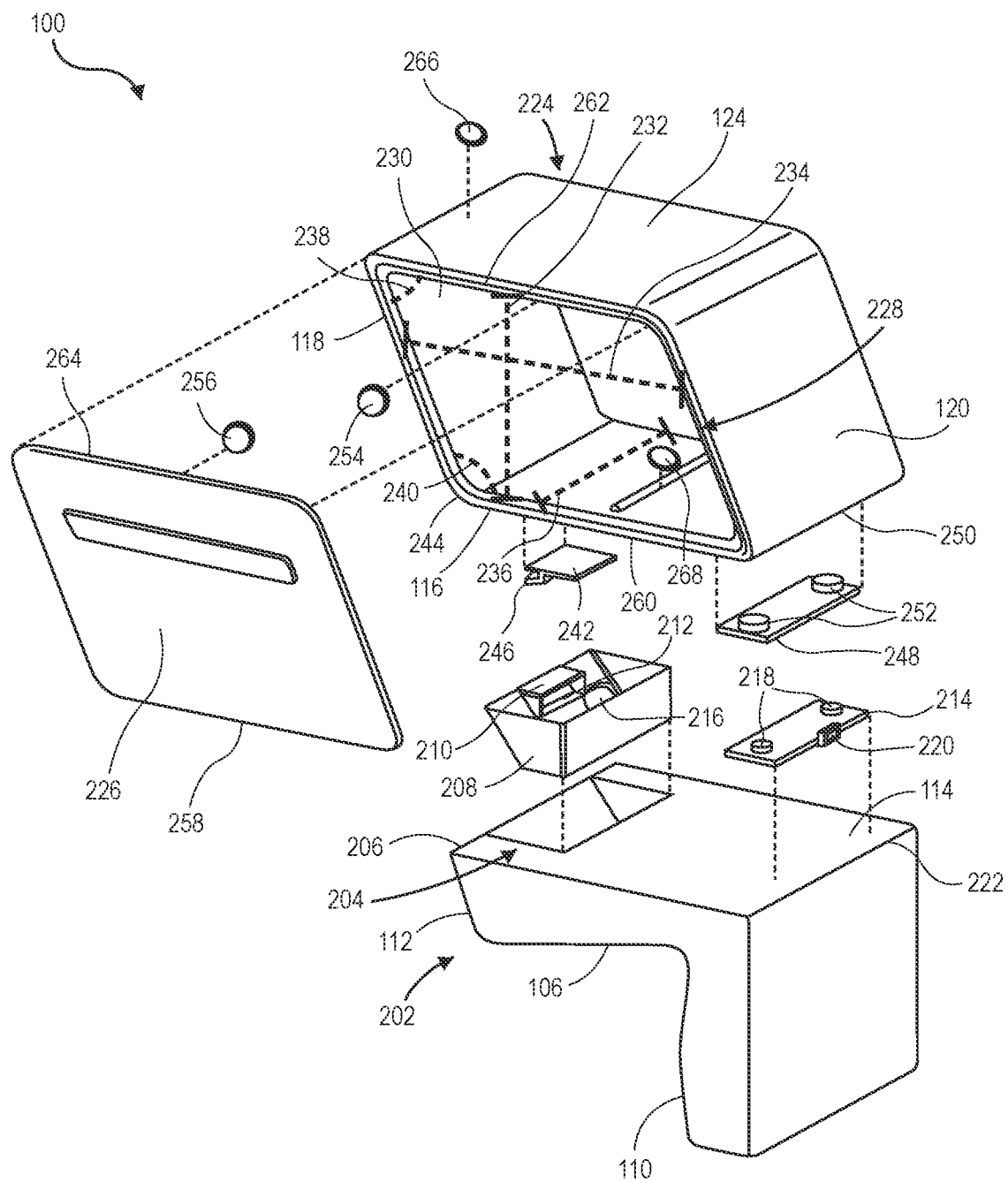
FIG. 2 provides an exploded, perspective view of the example vehicle container unit of FIG. 1, according to some embodiments of the present disclosure.

FIG. 2 provides an exploded, perspective view of the example vehicle container unit 100 of FIG. 1, according to some embodiments of the present disclosure. In particular, FIG. 2 illustrates components of the vehicle container unit 100 separated, where one or more of the components may be embedded within other components of the vehicle container unit 100 as described further.

The vehicle container unit 100 may include a body 202. The body 202 may be part of the base 102 (FIG. 1) and define a shape of the base 102. For example, the body 202 may have the shape and include the surfaces described in relation to the base 102 in FIG. 1. The body 202 may have the surface 106 that is to abut a seat, the surface 110 that is to abut a front of the seat and/or an infrastructure on which the seat is positioned, and a surface 112 that is to abut a back for the seat when the body 202 is mounted to the seat. The body 202 may further include the surface 114 onto which the vehicle container 104 (FIG. 1) is to be mounted. The body 202 may have an indentation 204 formed in the surface 114. In particular, the indentation 204 may extend into the body 202 from the surface 114. The indentation 204 may be located toward a first end 206 of the surface 114.

The body 202 may comprise a condensable material that may maintain a shape up to a certain force at which the material may condense. The material being condensable may help to prevent damage to other objects within the vehicle. The condensable material of the body 202 may comprise foam material. The foam material may comprise expanded polypropylene (EPP) foam in some embodiments. In some embodiments, the EPP foam may have a density of approximately (within 0.5 pound per cubic foot (lb/cuft)) 1.9 lb/cuft. The EPP foam may present energy absorption, multiple impact resistance, thermal insulation, buoyancy, water and chemical resistance, and a high strength to weight ratio. Accordingly, the EPP foam may allow the body 202 to keep shape while being light enough to be easily mounted to and removed from the seat.

The vehicle container unit 100 may further include an attachment element 208. The attachment element 208 may be embedded within the body 202. For example, the attachment element 208 may be embedded within the body 202 toward the first end 206 of the surface 114. The attachment element 208 may facilitate mounting of the base 102 to the seat. The attachment element 208 may have a shape that matches the shape of the indentation 204 and may be embedded within the portion of the body 202 with the indentation 204. Accordingly, the attachment element 208 may be located adjacent to the indentation 204, where the indentation 204 is encompassed by the attachment element 208 based on the shape and the position of the attachment element 208 relative to the indentation 204.

The attachment element 208 may have one or more apertures 216 formed in the attachment element 208. The apertures 216 may extend through the attachment element 208 and the body 202. For example, the apertures 216 may extend from the surface 114 to the surface 106, where the apertures 216 abut the indentation 204 formed in the surface 114. A tether may extend through the apertures 216 and connect to one or more anchors of the seat to mount the base 102 to the seat. In other embodiments, the tether may be coupled to the attachment element 208. In some of these other embodiments, the apertures 216 may be omitted with the tether being connected to the attachment element 208.

The attachment element 208 may include a mounting element to be utilized for mounting the vehicle container 104 to the base 102. The mounting element may receive a portion of the vehicle container 104 and may maintain (within 1 cm) a vertical position of the portion of the vehicle container 104 when the portion of the vehicle container 104 is located within the mounting element. The mounting element may include an extension 210 and a recess 212 located within the extension 210. In the illustrated embodiment, the extension 210 may form a rectangle around the recess 212 encircling the recess 212. The recess 212 may be to receive the portion of the vehicle container 104 and the extension 210 may maintain the vertical position of the portion of the vehicle container 104 when located within the recess 212.

The vehicle container unit 100 may further include a first mounting plate 214. The first mounting plate 214 may be embedded within the body 202. The first mounting plate 214 may be located toward a second end 222 of the surface 114, where the second end 222 is at an opposite end of the surface 114 from the first end 206. The first mounting plate 214 may engage with a portion of the vehicle container 104 and may maintain (within 1 cm) a horizontal position of the portion of the vehicle container 104 when engaged. The first mounting plate 214 may include one or more extrusions 218 that are to engage with the portion of the vehicle container 104. In the illustrated embodiment, the extrusions 218 have a circular shape, although it should be understood that the extrusions 218 may have a different shape in other embodiments. The extrusions 218 may extend approximately (within 5 degrees) perpendicular to the surface 114 when the first mounting plate 214 is embedded within the body 202. The extrusions 218 may extend out of the body 202 and a portion of the extrusions 218 may be exposed in some embodiments. In other embodiments, the extrusions 218 be embedded within the body 202 and may cause portions of the body 202 corresponding to the extrusions 218 to be extruded from the surface 114.

The first mounting plate 214 may further include an attachment mechanism 220. The attachment mechanism 220 may be utilized for attachment of a clip element to the attachment mechanism 220. For example, the attachment mechanism 220 may comprise an aperture in some embodiments, where a portion of the clip element may extend through the aperture to attach the clip element to the first mounting plate 214. The attachment mechanism 220 may extend outside of the body 202 past the second end 222 of the surface 114 and may be exposed. In some embodiments, the attachment mechanism 220 may be omitted from the first mounting plate 214. In these embodiments, the attachment mechanism 220 and/or the clip element may be coupled to the body 202 toward the second end 222 of the surface 114 by another structure.

The attachment element 208 and the first mounting plate 214 may comprise a rigid material. For example, the attachment element 208 and the first mounting plate 214 may comprise a plastic material. The attachment element 208 and the first mounting plate 214 being plastic material may provide for rigidity for mounting of the base 102 to the seat and mounting of the vehicle container 104 to the base 102.

In some embodiments, the plastic material of the attachment element 208 and the first mounting plate 214 may comprise acrylonitrile styrene acrylate (ASA).

The body 202, the attachment element 208, and the first mounting plate 214 may form the base 102. In particular, the body 202 with the attachment element 208 and the first mounting plate 214 embedded within the body 202 may form the base 102. The attachment element 208 may facilitate mounting of the base 102 to the seat. The attachment element 208 and the first mounting plate 214 may facilitate mounting of the vehicle container 104 to the base 102.

The vehicle container unit 100 may further include an enclosure 224 with a door 226. The enclosure 224 with the door 226 may be part of the vehicle container 104 and define a shape of the vehicle container 104. For example, the enclosure 224 with the door 226 may have the shape and include the surfaces described in relation to the vehicle container 104 in FIG. 1. The enclosure 224 may have the surface 116 that is to abut the base 102 when the vehicle container 104 is mounted to the base 102. In particular, the surface 116 may abut the surface 114 when the vehicle container 104 is mounted to the base. The enclosure 224 may further include the surface 118 that is to abut a back of the seat on which the vehicle container unit 100 is mounted, the surface 120 opposite to the surface 118, and the surface 124 opposite of the surface 116.

The enclosure 224 may enclose a space 228. The space 228 may be utilized for storage and transportation of items, where the items may be placed in the space and enclosed within the space 228 when the door 226 is closed. Inner walls 230 of the enclosure 224 may abut the space 228 and define dimensions of the space 228. For example, the space 228 may have a height 232 of approximately (within 10 mm) 317.5 mm defined by a top wall of the inner walls 230 and a bottom wall of the inner walls 230. The space 228 may further have a length 234 of approximately (within 10 mm) 524.065 mm defined by a front wall of the inner walls 230 opposite of the surface 120 and a back wall of the inner walls 230 opposite of the surface 118. The space 228 may further have a width 236 of approximately (within 10 mm) 446.61 mm defined by one of the inner walls 230 on the door 226 and another of the inner walls 230 opposite from the door 226. The inner walls 230 may form an angle 240 of approximately (within 5 degrees) 112.5 degrees between the bottom wall of the inner walls 230 and the back wall of the inner walls 230, and an angle 238 between the top wall of the inner walls 230 and the back wall of the inner walls 230. The inner walls 230 may be quadrilateral with opposite walls of the inner walls 230 being approximately (within 5 degrees) parallel and opposite angles formed by the inner walls 230 being approximately (within 5 degrees) equal. While the dimensions of the inner walls 230 and space 228 of the illustrated embodiment are provided, it should be understood that the dimensions provide one example of dimensions and the dimensions may be different in other embodiments.

The enclosure 224 and the door 226 may comprise a condensable material that may maintain a shape up to a certain force at which the material may condense. The material being condensable may help to prevent damage to other objects within the vehicle. The condensable material of the enclosure 224 and the door 226 may comprise foam material. The foam material may comprise EPP foam in some embodiments. A density of the. The EPP foam of the enclosure 224 and the door 226 may be multiple different densities of may be all one density. For example, the door 226 and a portion of the enclosure 224 that is to encircle the door 226 when the door 226 is closed may have a density of approximately (within 0.5 lb/cuft) 3.9 lb/cuft, and the rest of the enclosure 224 may have a density of approximately (within 0.5 lb/cuft) 1.9 lb/cuft in some embodiments. The EPP foam may present energy absorption, multiple impact resistance, thermal insulation, buoyancy, water and chemical resistance, and a high strength to weight ratio. Accordingly, the EPP foam may allow the enclosure 224 to keep shape while being light enough to be easily mounted to and removed from the seat. Further, the EPP foam may help to maintain a temperature within the space 228 and provide easy clean up of any spills that may occur from items being transported within the enclosure 224.

The enclosure 224 may include one or more magnets for maintaining the door 226 in a closed position absent external forces. In particular, the magnets may maintain the door 226 closed against the rest of the enclosure 224 when the door 226 is positioned against the rest of the enclosure 224. The door 226 may be maintained in the closed position until an amount of external force away from the rest of the enclosure 224 is applied to the door 226 that exceeds an amount of magnetic force being applied to the door 226 by the magnets to maintain the door 226 in the closed position. In the illustrated embodiment, a first magnet 254 may be embedded in the enclosure 224 and a second magnet 256 embedded within the door 226 to maintain the door 226 in the closed position. A bottom edge 258 of the door 226 may be rotationally coupled to an edge 260 of the surface 116 via a hinge. In some embodiments, the hinge may comprise a poly hinge. The first magnet 254 may be embedded within the enclosure 224 at an edge 262 of the surface 124, where the edge 262 is to abut the door 226 and is located opposite of the edge 260 with the hinge. The second magnet 256 may be embedded near a top edge 264 of the door 226, the top edge 264 opposite from the bottom edge 258 with the hinge. When the door 226 is closed, the first magnet 254 and the second magnet 256 may be located next to each other and may generate a magnetic force that maintains the door 226 in the closed position. While magnets are described for maintaining the door in a closed position, it should be understood that one or more of the magnets may be replaced with a material (such as a metal) on which a magnet may act to generate a magnetic force in other embodiments. For example, one of the first magnet 254 and the second magnet 256 may comprise a magnet and the other of the first magnet 254 and the second magnet 256 may comprise a material on which a magnet may act in other embodiments.

The enclosure 224 may further include one or more magnets to maintain a divider element in certain positions (as described further throughout this disclosure). For example, the enclosure 224 may include a first magnet 266 and a second magnet 268 in the illustrated embodiment. The first magnet 266 may be embedded within the enclosure 224 toward an end of the surface 124. The first magnet 266 may be to maintain the divider element in a first position against one of the inner walls 230 of the enclosure 224. The second magnet 268 may be embedded within the enclosure toward a center of the surface 116. The second magnet 268 may be to maintain the divider element in a second position that subdivides the space 228. The first magnet 266 and the second magnet 268 may act with another magnet embedded within the divider element when in the corresponding positions to maintain the divider element in the corresponding positions. When in the corresponding positions, the first magnet 266 and the second magnet 268 may align with the magnet in the divider element to produce a magnetic force to maintain the divider element in the position. For example, the first magnet 266 may align with the magnet in the divider element when the divider element is in the first position and produce a magnetic force that maintains the divider element in the first position. The second magnet 268 may align with the magnet in the divider element when the divider element in the second position and produce a magnetic force that maintains the divider element in the second position. While magnets are described for maintaining the divider element in the positions, it should be understood that one or more of the magnets may be replaced with a material (such as metal) on which a magnet may act to generate the magnetic force in other embodiments. Further, one or more of the magnets for maintaining the divider element in the positions may be omitted and/or embedded in different locations in other embodiments. For example, the magnets for maintaining the divider element may be omitted in embodiments where a divider element in omitted from the enclosure 224.

The vehicle container unit 100 may further include a mounting element 242. The mounting element 242 may be embedded within the enclosure 224. In particular, the mounting element 242 may be embedded within the enclosure 224 at the surface 116. The mounting element 242 may be located toward a first end 244 of the surface 116. The mounting element 242 may include an arm 246 that extends from the enclosure 224 from the surface 116 with the mounting element 242 embedded within the enclosure 224. The arm 246 may engage with the attachment element 208 to facilitate mounting of the vehicle container 104 to the base 102. For example, the arm 246 may be positioned within the recess 212 to facilitate mounting of the vehicle container 104 to the base 102, where the extension 210 may maintain (within 1 cm) a vertical position of the arm 246 when positioned within the recess 212. Positioning the arm 246 within the recess 212 may include rotating the arm 246 to insert the arm 246 into the recess 212.

The vehicle container unit 100 may further include a second mounting plate 248. The second mounting plate 248 may be embedded in the enclosure 224. The second mounting plate 248 may be located toward a second end 250 of the surface 116, wherein the second end 250 is at an opposite end of the surface 116 from the first end 244. The second mounting plate 248 may engage with the first mounting plate 214 to facilitate mounting of the vehicle container 104 to the base 102. In particular, the second mounting plate 248 may include one or more extrusions 252 that form spaces into which the extrusions 218 of the first mounting plate 214 may be inserted. The extrusions 252 may have a diameter greater than the extrusions 218, such that the extrusions 218 fit into the spaces produced by the extrusions 252. The first mounting plate 214 may maintain (within 1 cm) a horizontal position of the second mounting plate 248 when the extrusions 218 are positioned in the space produced by the extrusions 252.

The mounting element 242 and the second mounting plate 248 may comprise a rigid material. For example, the mounting element 242 and the second mounting plate 248 may comprise a plastic material. The mounting element 242 and the second mounting plate 248 being plastic material may provide for rigidity for mounting of the vehicle container 104 to the base 102. In some embodiments, the plastic material of the mounting element 242 and the second mounting plate 248 may comprise ASA.

The enclosure 224 with the door 226, the mounting element 242, and the second mounting plate 248 may form the vehicle container 104. In particular, the enclosure 224 with the mounting element 242 and the second mounting plate 248 embedded within the enclosure 224 may form the vehicle container 104. The mounting element 242 and the second mounting plate 248 may facilitate mounting of the vehicle container 104 to the base 102

Figure 3:
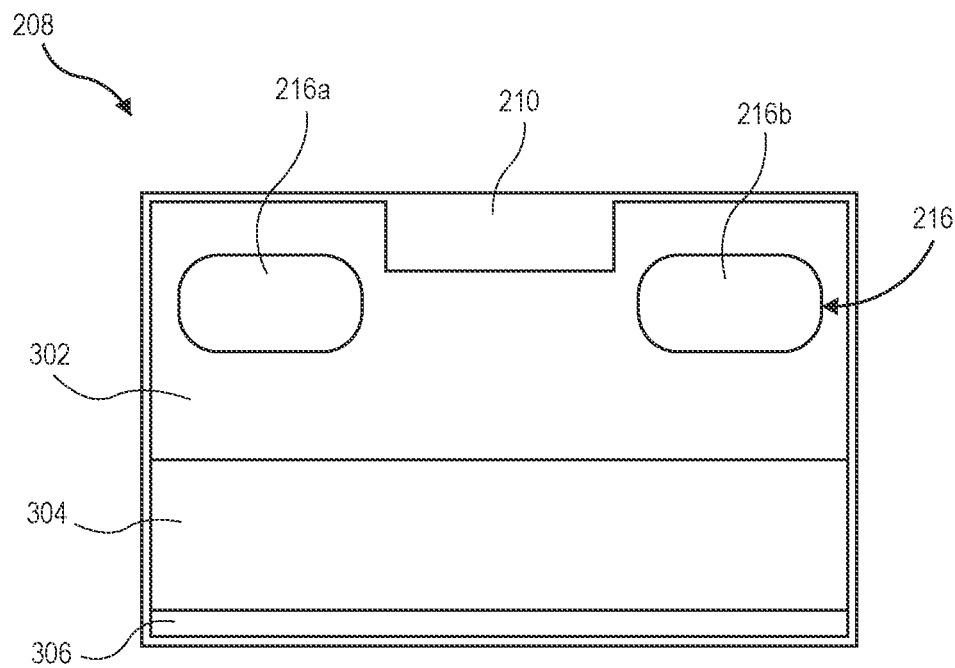
FIG. 3 provides a top view of the example attachment element shown in FIG. 2, according to some embodiments of the present disclosure.

FIG. 3 provides a top view of the example attachment element 208 shown in FIG. 2, according to some embodiments of the present disclosure. In particular, FIG. 3 illustrates a view of the attachment element 208 from a side that is to be directed toward the vehicle container 104 (FIG. 1) when the attachment element 208 is embedded within the body 202 (FIG. 2).

The attachment element 208 may have a first portion 302, a second portion 304, and a third portion 306. The second portion 304 may be recessed from the edges of the attachment element 208 may be substantially (within 5 degrees) parallel to the surface 114 (FIG. 1) of the body 202 when the attachment element 208 is embedded within the body 202. The first portion 302 and the third portion 306 may extend from edges of the attachment element 208 to the second portion 304.

The attachment element 208 may include the apertures 216. In particular, the attachment element 208 includes a first aperture 216a and a second aperture 216b. The first aperture 216a and the second aperture 216b may be through the first portion 302 of the attachment element 208. The first aperture 216a may be located on a first side of the extension 210 and the second aperture 216b may be located on a second side of the extension 210, the second side being opposite to the first side. A tether may be routed through the first aperture 216a and the second aperture 216b to connect to anchors of the seat and mount the base 102 (FIG. 1) to the seat.

Figure 4:
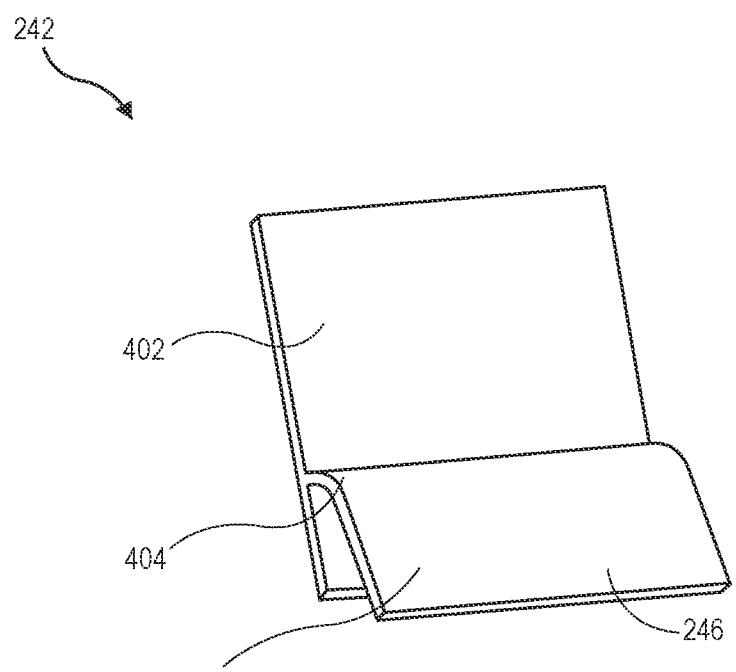
FIG. 4 provides a perspective view of the example mounting element shown in FIG. 2, according to some embodiments of the present disclosure.

FIG. 4 provides a perspective view of the example mounting element 242 shown in FIG. 2, according to some embodiments of the present disclosure. In particular, FIG. 4 shows the mounting element 242 in a perspective view from a side of the mounting element 242 that has the arm 246.

The mounting element 242 may include a base piece 402. The base piece 402 may be flat or have small variations from being flat. The base piece 402 may embedded within the enclosure 224. The arm 246 may extend from a surface of the base piece 402. For example, the arm 246 may have a curved portion 404 that attaches the base piece 402 and extends from the base piece 402. The arm 246 may further have a flat portion 406 at an opposite end of the curved portion 404 from the base piece 402, where the flat portion 406 may be flat or have small variations from being flat. The arm 246 may extend out of the enclosure 224 when the flat portion 406 is embedded within the enclosure 224. The arm 246 may be positioned within the recess 212 (FIG. 2) to mount the vehicle container 104 (FIG. 1) to the base 102 (FIG. 1).

Figure 5:
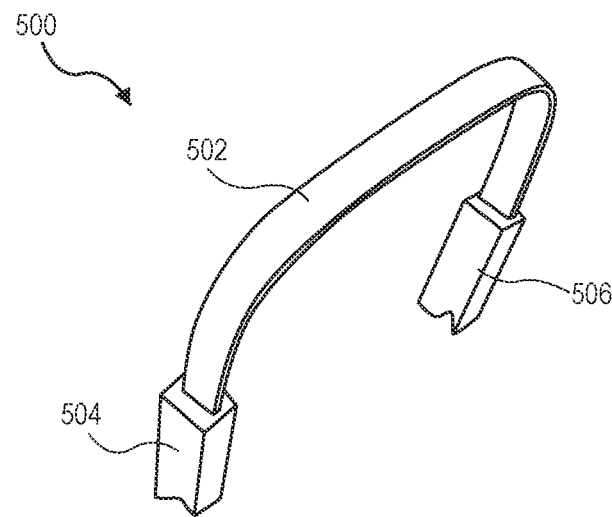
FIG. 5 provides an example tether, according to some embodiments of the present disclosure.

FIG. 5 provides an example tether 500, according to some embodiments of the present disclosure. In particular, the tether 500 may be a tether utilized for mounting a base (such as the base 102 (FIG. 1)) to a seat of a vehicle.

The tether 500 may include a strap portion 502. The strap portion 502 may comprise a flexible material, such as a flexible plastic, a flexible cloth, or some other flexible material. In some embodiments, the strap portion 502 may maintain a curve as shown in the illustrated embodiment absent external forces. In some embodiments, a length of the strap portion 502 may adjustable, while in other embodiments a length of the strap portion 502 may be set. The strap portion 502 may be attached to a first latching element 504 at one end of the strap portion 502 and a second latching element 506 located at the other end of the strap portion 502. The first latching element 504 and the second latching element 506 may each be configured to connect to anchors of a seat of a vehicle. The anchors may comprise, or be part of, an anchor system of the seat. In some embodiments, the anchors may comprise one or more hooks located between the seat and the back of the seat within the vehicle. The tether 500 may mount a base (such as the base 102 (FIG. 1)) to a seat of a vehicle when the tether 500 is positioned within the base and the first latching element 504 and the second latching element 506 are connected to the anchors of the anchor system of the seat.

Figure 6:
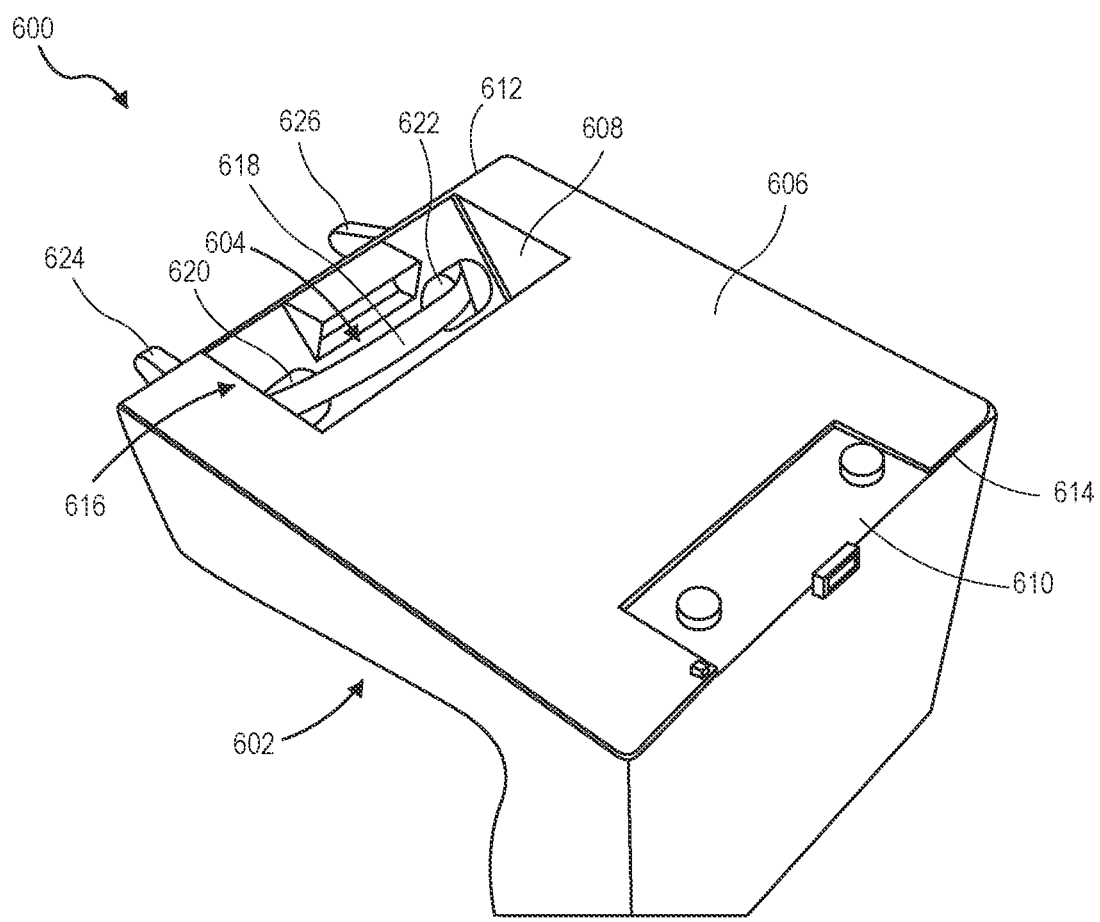
FIG. 6 provides an example base arrangement, according to some embodiments of the present disclosure.

FIG. 6 provides an example base arrangement 600, according to some embodiments of the present disclosure. For example, the base arrangement 600 may include a base 602 with tether 604 arranged as to mount the base 602 to a seat.

The base 602 may include one or more of the features of the base 102 (FIG. 1). For example, the base 602 may include a body 606 with an attachment element 608 and a mounting plate 610 embedded within the body 606. The body 606 may include one or more of the features of the body 202. Further, the attachment element 608 may include one or more of the features of the attachment element 208 (FIG. 2) and the mounting plate 610 may include one or more of the features of the first mounting plate 214 (FIG. 2). The attachment element 608 may be embedded within the body 606 toward a first end 612 of the body 606 and the mounting plate 610 may be embedded within the body 606 toward a second end 614 of the body 606, the second end 614 being opposite from the first end 612. The body 606 may further include an indentation 616 toward the first end 612, where the attachment element 608 is mounted in the body 606 adjacent to the indentation 616 and where a space formed by a shape of the attachment element 608 encompasses a space formed by the indentation 616.

The tether 604 may include one or more of the features of the tether 500 (FIG. 5). The tether 604 may be routed through apertures of the attachment element 608 to mount the base 602 to a seat. In particular, a strap portion 618 of the tether 604 may extend between and through apertures of the attachment element 608. For example, the strap portion 618 extends between and through a first aperture 620 and a second aperture 622 of the attachment element 608 in the illustrated embodiment. A first latching element 624 and a second latching element 626 located at the ends of the strap portion 618 of the tether 604 may extend away from the apertures and the body 606. The first latching element 624 and the second latching element 626 may connect to anchors of a seat to mount the base 602 to the seat.

Figure 7:
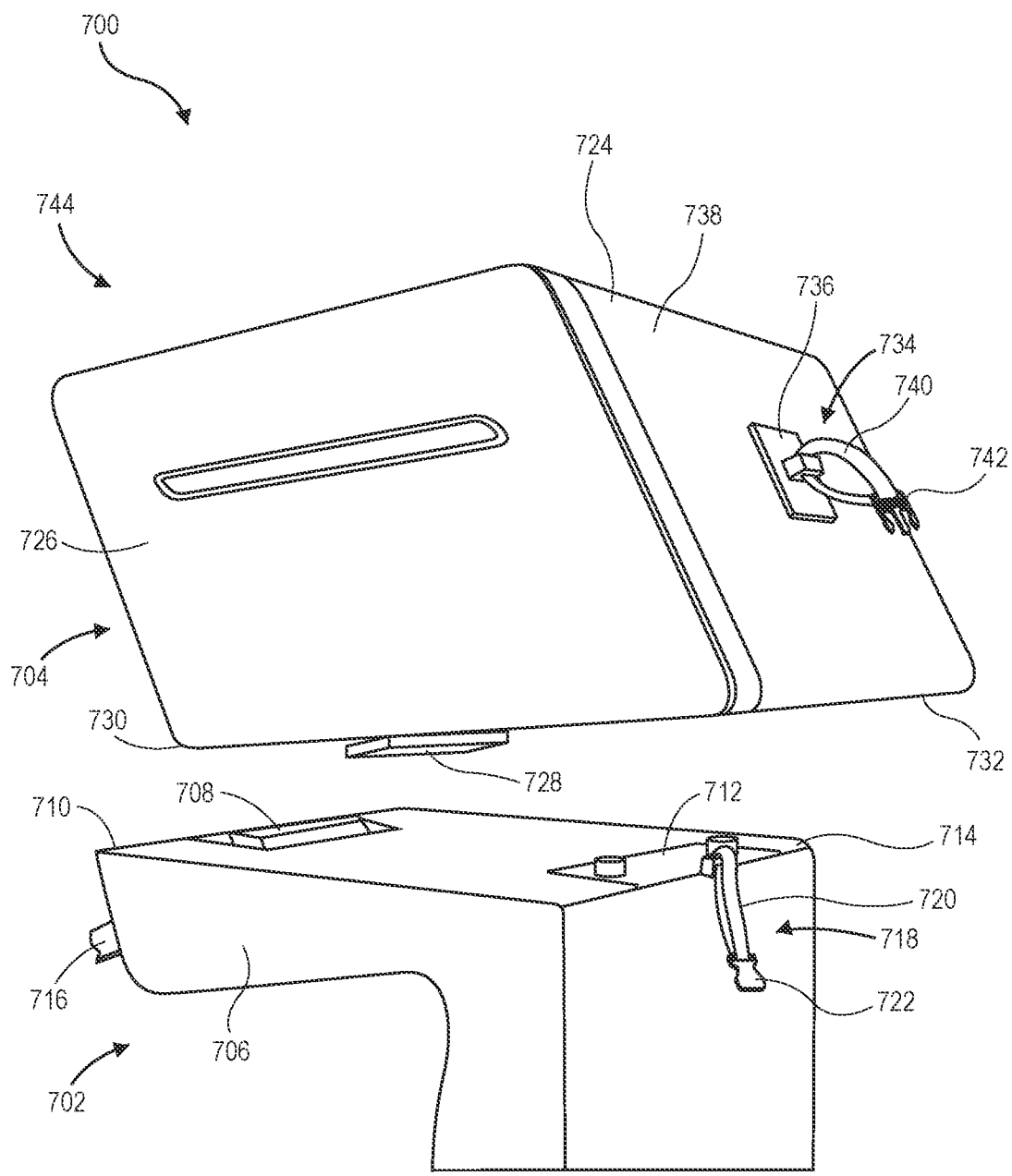
FIG. 7 provides an example vehicle container unit arrangement, according to some embodiments of the present disclosure.

FIG. 7 provides an example vehicle container unit arrangement 700, according to some embodiments of the present disclosure. The vehicle container unit arrangement 700 may include a vehicle container unit 744 one or more of the features of the vehicle container unit 100 (FIG. 1). For example, the vehicle container unit 744 may include a base 702 and a vehicle container 704, where the base 702 may include one or more of the features of the base 102 (FIG. 1) and the vehicle container 704 may include one or more of the features of the vehicle container 104 (FIG. 1). In the illustrated embodiment, the base 702 and the vehicle container 704 are illustrated being separate prior to mounting of the vehicle container 704 to the base 702.

The base 702 includes a body 706 with an attachment element 708 embedded toward a first end 710 of the body 706 and a first mounting plate 712 embedded toward a second end 714 of the body 706. The attachment element 708 may include one or more of the features of the attachment element 208 (FIG. 2) and the first mounting plate 712 may include one or more of the features of the first mounting plate 214 (FIG. 2). The base 702 may further include a tether 716 that extends from the body 706 to mount the base to a seat, where the tether 716 includes one or more of the features of the tether 500 (FIG. 5).

The base 702 may further include a first clip element 718. The first clip element 718 may be coupled to the body 706 toward the second end 714 of the body 706. For example, the first clip element 718 may be coupled to an attachment mechanism (such as the attachment mechanism 220 (FIG. 2)) of the first mounting plate 712 at one end. The first clip element 718 may include a strap portion 720. The strap portion 720 may comprise a flexible material, such as a flexible plastic or a flexible cloth. The first clip element 718 may further include a clip buckle 722. The clip buckle 722 may be coupled to the strap portion 720 at an opposite end of the strap portion 720 from the attachment mechanism.

The vehicle container 704 may include an enclosure 724 with a door 726. The enclosure 724 may include a mounting element 728 embedded toward a first end 730 of the enclosure 724 and a second mounting plate (such as the second mounting plate 248 (FIG. 2); obscured due to view) embedded toward a second end 732 of the enclosure 724. The mounting element 728 may include one or more features of the mounting element 242 (FIG. 2). The second mounting plate may include one or more of the features of the second mounting plate 248.

The vehicle container 704 may further include a second clip element 734. The second clip element 734 may be coupled to the enclosure 724 toward the second end 732 of the enclosure 724. For example, the second clip element 734 may be coupled to the enclosure 724 via an attachment plate 736 embedded within the enclosure 724 at a side 738 of the enclosure 724 that is adjacent to the second end 732. The second clip element 734 may include a strap portion 740. The strap portion 740 may be coupled to the attachment plate 736 at one end. The strap portion 740 may comprise a flexible material, such as a flexible plastic or a flexible cloth. In some embodiments, the strap portion 740 of the second clip element 734 may comprise a same material as the material of the strap portion 720 of the first clip element 718. The second clip element 734 may further include a clip buckle 742. The clip buckle 742 may be coupled to the strap portion 740 at an opposite end of the strap portion 720 from the attachment plate 736.

The second clip element 734 may connect to the first clip element 718 when the vehicle container 704 is mounted to the base 702. In particular, the clip buckle 742 of the second clip element 734 may connect to the clip buckle 722 of the first clip element 718. The clip buckle 742 and the clip buckle 722 may comprise mating clip buckles. For example, the clip buckle 742 may comprise a male clip buckle with a portion to be inserted into a female clip buckle to connect and the clip buckle 722 may comprise a female clip buckle to receive a portion of a male clip buckle to connect.

Mounting the vehicle container 704 to the base 702 may comprise a procedure of lowering the vehicle container 704 onto the base 702 such that the mounting element 728 of the vehicle container 704 couples with the attachment element 708 of the base 702 and the second mounting plate couples with the first mounting plate 712 of the base 702. The procedure may include lowering the first end 730 of the enclosure 724 onto the first end 710 of the body 706 with an arm (such as the arm 246 (FIG. 2)) of the mounting element 728 being positioned within a recess (such as the recess 212 (FIG. 2)) of the attachment element 708, which may involve sliding the arm into the recess and moving the enclosure 724 accordingly relative to the body 706. Once the arm has been positioned within the recess, the second end 732 of the enclosure 724 may be lowered onto the second end 714 of the body 706 with the second mounting plate coupling with the first mounting plate 712. As the second end 732 of the enclosure 724 is lowered, the arm may rotate within the recess to be positioned in a coupling position within the recess. After the second end 732 of the enclosure 724 has been lowered against the second end 714 of the body 706, the first clip element 718 may be connected with the second clip element 734 to maintain the second end 732 of the enclosure 724 against the second end 714 of the body 706.

The attachment element 708, the first mounting plate 712, and/or the first clip element 718 may be included in a mounting mechanism of the base 702. Further, the mounting element 728, the second mounting plate, and/or the second clip element 734 may be included in a mounting mechanism of the vehicle container 704. When the mounting mechanism of the base 702 and the mounting mechanism of the vehicle container 704 are coupled together, the vehicle container 704 may be mounted to the base 702 and may be maintained on the base 702.

Figure 8:
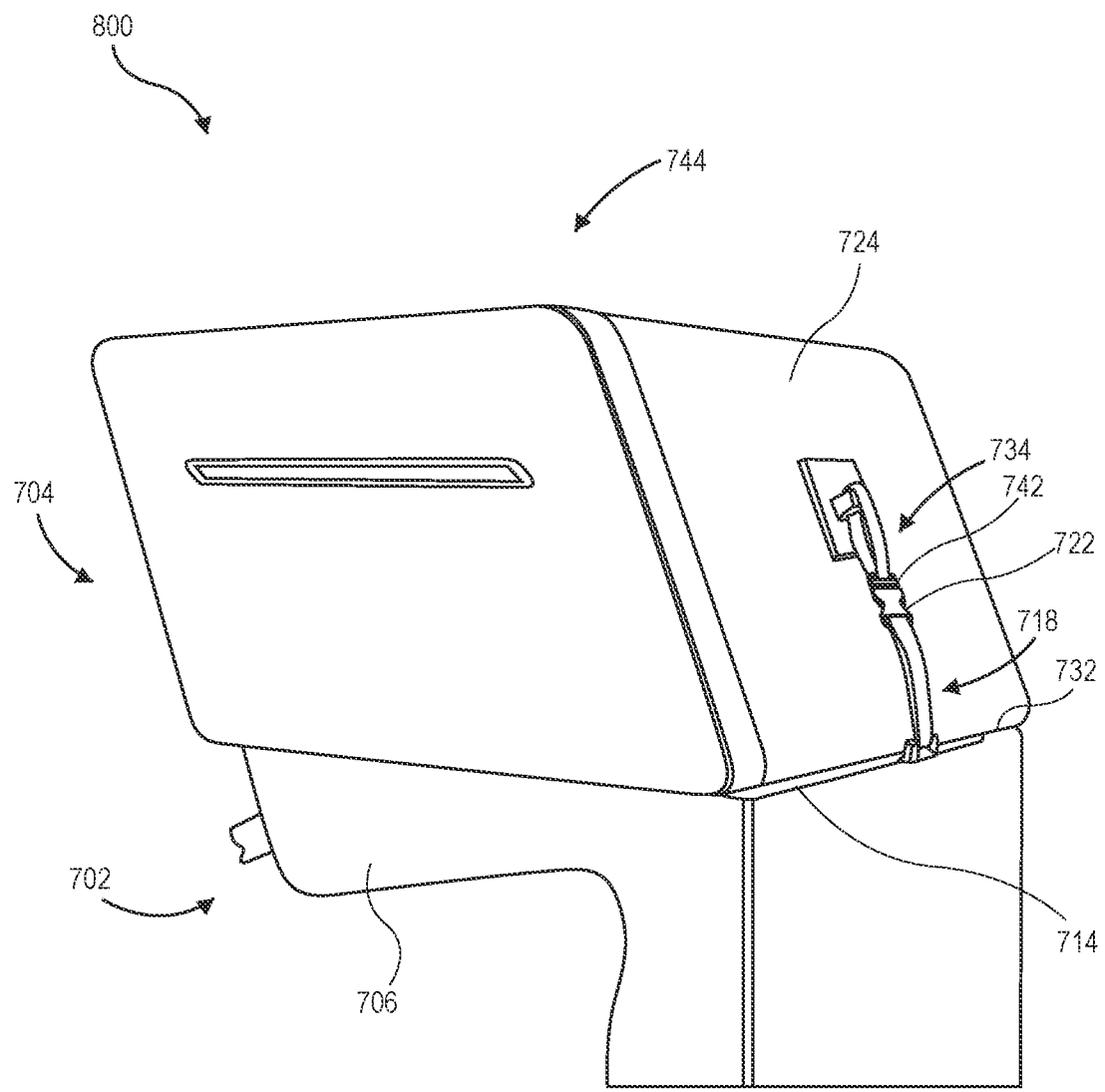
FIG. 8 provides another example vehicle container unit arrangement, according to some embodiments of the present disclosure.

FIG. 8 provides another example vehicle container unit arrangement 800, according to some embodiments of the present disclosure. In particular, the vehicle container unit arrangement 800 illustrates the vehicle container unit 744 of FIG. 7. In the illustrated vehicle container unit arrangement 800, the vehicle container 704 is mounted to the base 702.

The vehicle container 704 may be positioned on the base 702 when the vehicle container 704 is mounted to the base 702. As can be seen, the first clip element 718 is connected to the second clip element 734 when the vehicle container 704 is mounted to the base 702. In particular, the clip buckle 722 of the first clip element 718 is connected to the clip buckle 742 of the second clip element 734. The first clip element 718 and the second clip element 734 being connected may maintain the second end 732 of the enclosure 724 against the second end 714 of the body 706. Maintaining the second end 732 of the enclosure 724 against the second end 714 of the body 706 may maintain engagement of the attachment element 708 (FIG. 7) with the mounting element 728 (FIG. 7) and engagement of the first mounting plate 712 (FIG. 7) with the second mounting plate to maintain the vehicle container 704 being mounted to the base 702.

Figure 9:
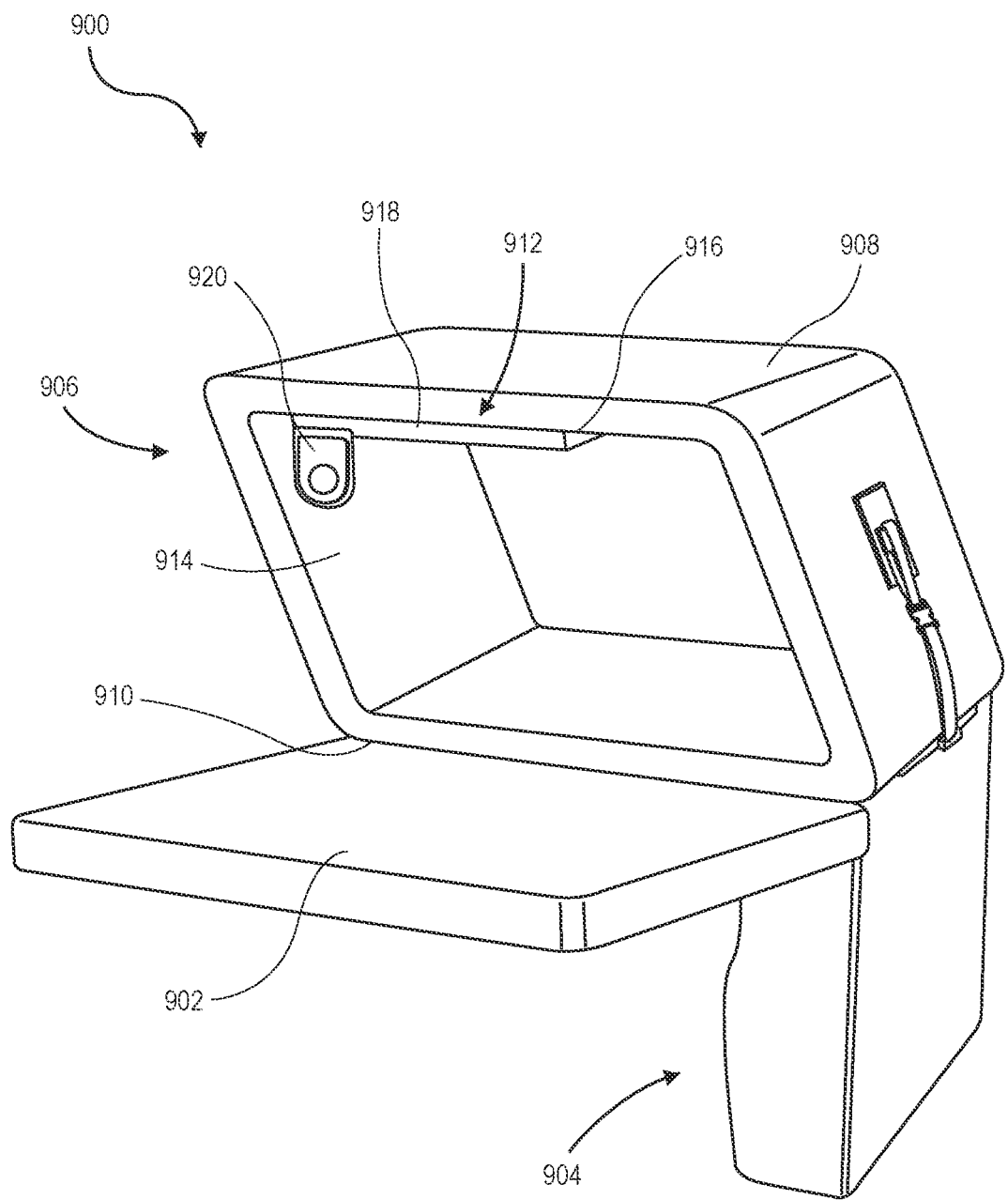
FIG. 9 provides another example vehicle container unit, according to some embodiments of the present disclosure.

FIG. 9 provides another example vehicle container unit 900, according to some embodiments of the present disclosure. The vehicle container unit 900 may include one or more of the features of the vehicle container unit 100 (FIG. 1). The vehicle container unit 900 may include a base 904 and a vehicle container 906, where the vehicle container 906 is shown mounted to the base 904.

The vehicle container unit 900 is illustrated with a door 902 of the vehicle container unit 900 in an open position. For example, the door 902 is shown rotated away from a rest of an enclosure 908 of the vehicle container 906 via a hinge 910. The hinge 910 may comprise couple the door 902 to the enclosure 908 and the door 902 may rotate about the hinge 910. In some embodiments, the hinge 910 may comprise a poly hinge.

The vehicle container 906 may include a divider element 912. The divider element 912 may be coupled to an inner wall of inner walls 914 of the enclosure 908 via a hinge 916. The divider element 912 may rotate about the hinge 916 between two or more different positions. In some embodiments, the hinge 916 may comprise a poly hinge. The inner walls 914 of the enclosure 908 may surround a space within the enclosure 908 in which items are to be placed for transportation, where the inner walls 914 may enclose the space when the door 902 is closed. In the illustrated embodiment, the divider element 912 may be coupled to an inner wall at the top of the enclosure 908 via the hinge 916.

The divider element 912 may include a wall 918 that is coupled at one end to the inner wall via the hinge 916. The divider element 912 may include a handle 920 coupled to the wall 918 and may utilized for rotating the wall 918 about the hinge 916. The handle 920 may be coupled to the wall 918 via a hinge, such as a poly hinge. In some embodiments, the handle 920 may be omitted.

The divider element 912 may be rotated between positions about the hinge 916. In the illustrated embodiment, the divider element 912 is shown in a first position where the divider element 912 is rotated against the inner wall at the top of the enclosure 908. The divider element 912 may include a magnet (see FIG. 10) embedded within the wall 918 of the divider element 912. When in the first position, the magnet of the divider element 912 may align with a magnet embedded within the enclosure 908, such as the first magnet 266 (FIG. 2). The magnets being aligned may produce a magnetic force that can maintain the divider element 912 in the first position absent an external force. In particular, the divider element 912 may be maintained in the first position by the magnets until an external force away from the first position exceeds the magnetic force.

Figure 10:
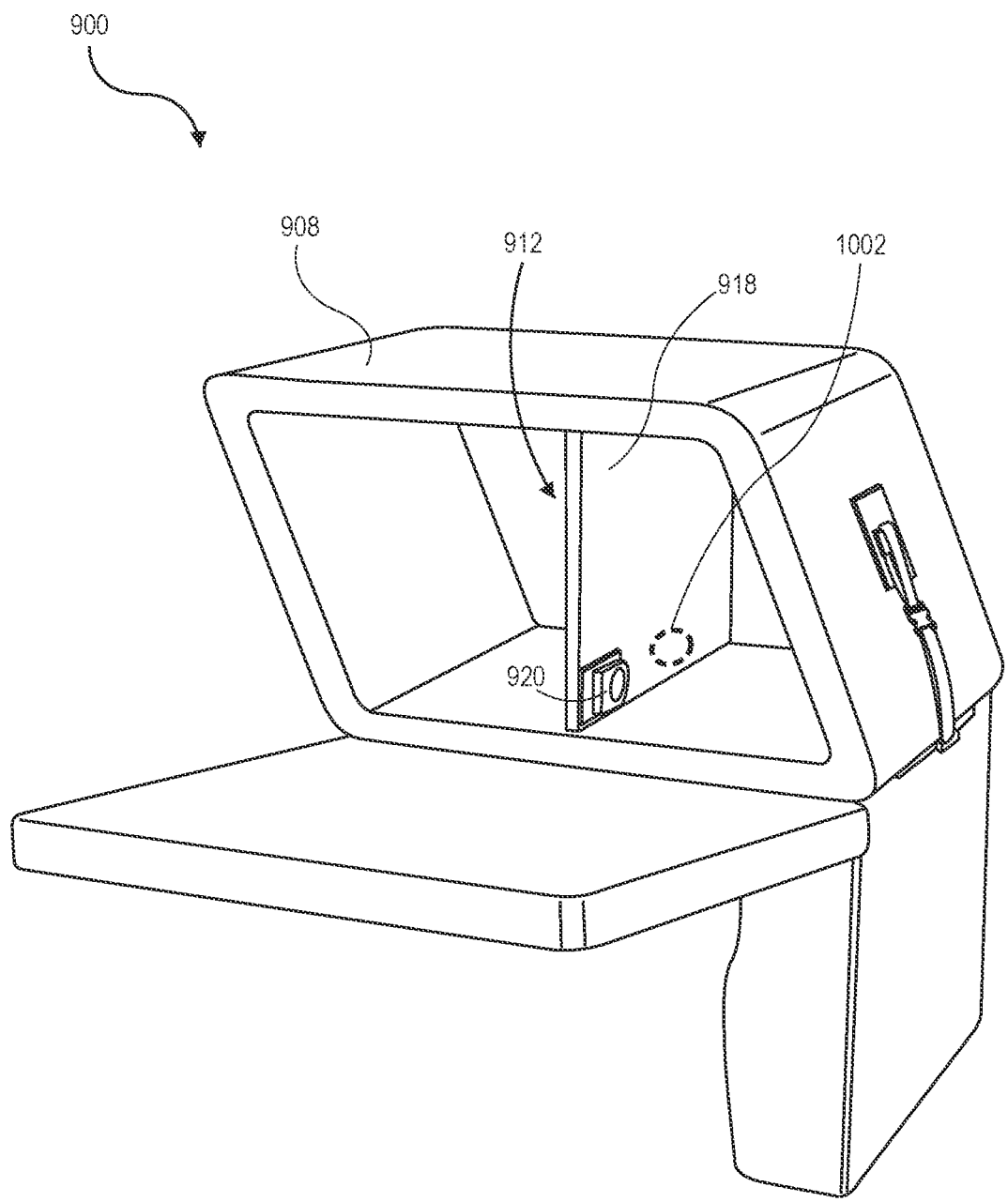
FIG. 10 provides another arrangement of the example vehicle container unit of FIG. 9, according to some embodiments of the present disclosure.

FIG. 10 provides another arrangement of the example vehicle container unit 900 of FIG. 9, according to some embodiments of the present disclosure. In particular, the vehicle container unit 900 is illustrated with the divider element 912 in a second position where the divider element 912 subdivides the space within the enclosure 908.

The divider element 912 may include the magnet 1002 embedded within the wall 918. The magnet 1002 may be located toward an end of the wall 918 opposite from the hinge that couples the wall 918 to the inner wall of the enclosure 908. When in the second position, the magnet 1002 may align with a magnet embedded within the enclosure 908, such as the second magnet 268 (FIG. 2). The magnets being aligned may produce a magnetic force that can maintain the divider element 912 in the second position absent an external force. In particular, the divider element 912 may be maintained in the second position by the magnets until an external force away from the second position exceeds the magnetic force. In other embodiments, the magnet embedded within the enclosure 908 may be omitted and a weight and/or friction between the divider element 912 and the enclosure 908 may maintain the divider element 912 in the second position. While the magnet 1002 and the magnets within the enclosure 908 are described as being magnets, it should be understood that one or more of the magnets may be replaced by material (such as metal) on which a magnet may act to generate a magnetic force in other embodiments.

In the illustrated embodiment, the handle 920 is rotated against the wall 918 when in the second position. In particular, the handle 920 may have been rotated about a hinge that couples the handle 920 to the wall 918 to be positioned against the wall 918. In other instances, the handle 920 may be positioned away from the wall 918. The handle 920 may be utilized for rotating the wall 918 between the first position and the second position, as well as among other positions. In particular, force may be applied to the handle 920 by a user to rotate the wall 918 between different positions. The force applied to the handle 920 may exceed the magnetic force produced by the magnets to rotate the wall 918 between the different positions.

Figure 11:
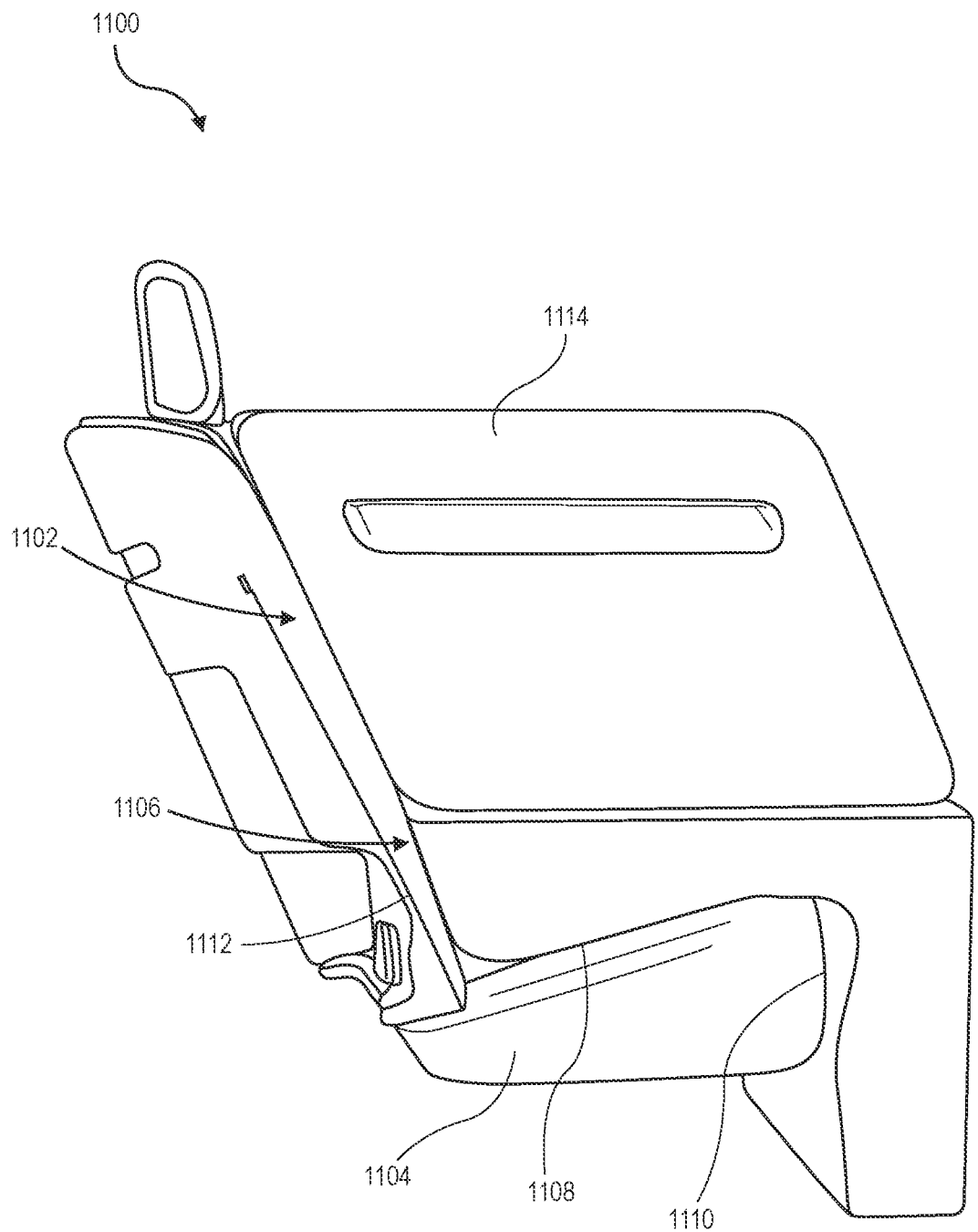
FIG. 11 provides an example vehicle container unit arrangement, according to some embodiments of the present disclosure.

FIG. 11 provides an example vehicle container unit arrangement 1100, according to some embodiments of the present disclosure. In particular, the vehicle container unit arrangement 1100 illustrates a vehicle container unit 1102 mounted on a seat 1104. The vehicle container unit 1102 may include one or more of the features of the vehicle container unit 100 (FIG. 1) and/or the vehicle container unit 900 (FIG. 9).

A base 1106 of the vehicle container unit 1102 may be mounted on top of the seat 1104. In particular, a tether (such as the tether 500 (FIG. 5)) of the base 1106 may be connected to one or more anchors of the seat 1104 and mount the base 1106 to the seat 1104. Portions of the base 1106 may extend along a top 1108 of the seat 1104, a front 1110 of the seat 1104, and a back 1112 of the seat 1104. The portions of the base 1106 may be contoured to the top 1108, front 1110, and/or back 1112 of the seat 1104, respectively, in some embodiments.

An enclosure 1114 of the vehicle container unit 1102 may be mounted on top of the base 1106. A portion of the enclosure 1114 may extend along the back of the seat 1104. The portion of the enclosure 1114 may be contoured to the back 1112 of the seat 1104 in some embodiments.

Figure 12:
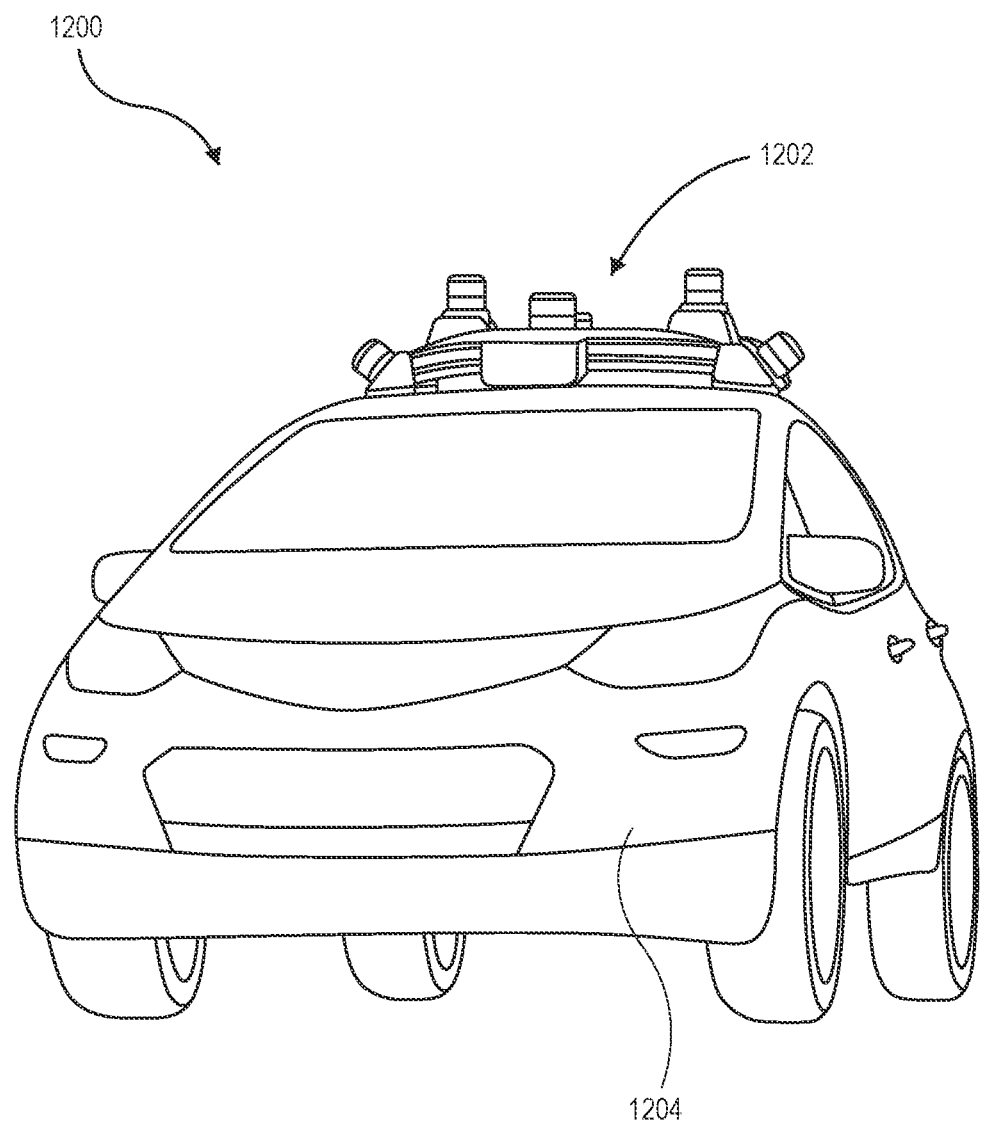
FIG. 12 illustrates an example autonomous vehicle, according to embodiments described herein.

FIG. 12 illustrates an example autonomous vehicle 1200, according to embodiments described herein. The autonomous vehicle 1200 in which a vehicle container unit (such as the vehicle container unit 100 (FIG. 1), the vehicle container unit 744 (FIG. 7), the vehicle container unit 900 (FIG. 9) and/or the vehicle container unit 1102 (FIG. 11)) may be mounted. For example, the vehicle container unit may be mounted in a seat in the back of the autonomous vehicle 1200, and/or a passenger seat of the autonomous vehicle 1200.

The autonomous vehicle 1200 may comprise a car 1204. The autonomous vehicle 1200 may include one or more sensors 1202 mounted to the car 1204. The sensors 1202 may be mounted to various locations on the car 1204. For example, the sensors 1202 may be mounted to a roof of the car 1204, side mirrors of the car 1204, a front of the car 1204, a back of the car 1204, sides of the car 1204, or some combination thereof.

The sensors 1202 may include one or more cameras, one or more light detection and ranging (LIDAR) sensors, one or more radar sensors, or some combination thereof. In some embodiments, the radar sensors may include articulating radar sensors, long-range radar sensors, short-range radar sensors, or some combination thereof. The sensors 1202 may detect the surroundings of the autonomous vehicle 1200. For example, the sensors 1202 may detect one or more objects surrounding the autonomous vehicle 1200, such as other cars, pedestrians, trees, bicycles, objects within a road on which the autonomous vehicle 1200 is travelling (such as construction and/or other objects that may impede movement of the vehicle), and/or indications surrounding the autonomous vehicle 1200 (such as construction signs, stop indicators, and other street signs).

The autonomous vehicle 1200 may further include a computer coupled to the sensors 1202. The computer may receive data captured by the sensors 1202 and utilize the data for localization, perception, prediction, route planning, maneuver planning, motion planning, path following, and low level controls of the autonomous vehicle 1200. Further, the computer may be communicatively coupled to a server and may exchange communications with the server. The computer may further be coupled to one or more of the systems of the autonomous vehicle 1200 and may control operation of throttle, braking, steering, and/or indicators of the autonomous vehicle 1200.

Figure 13:
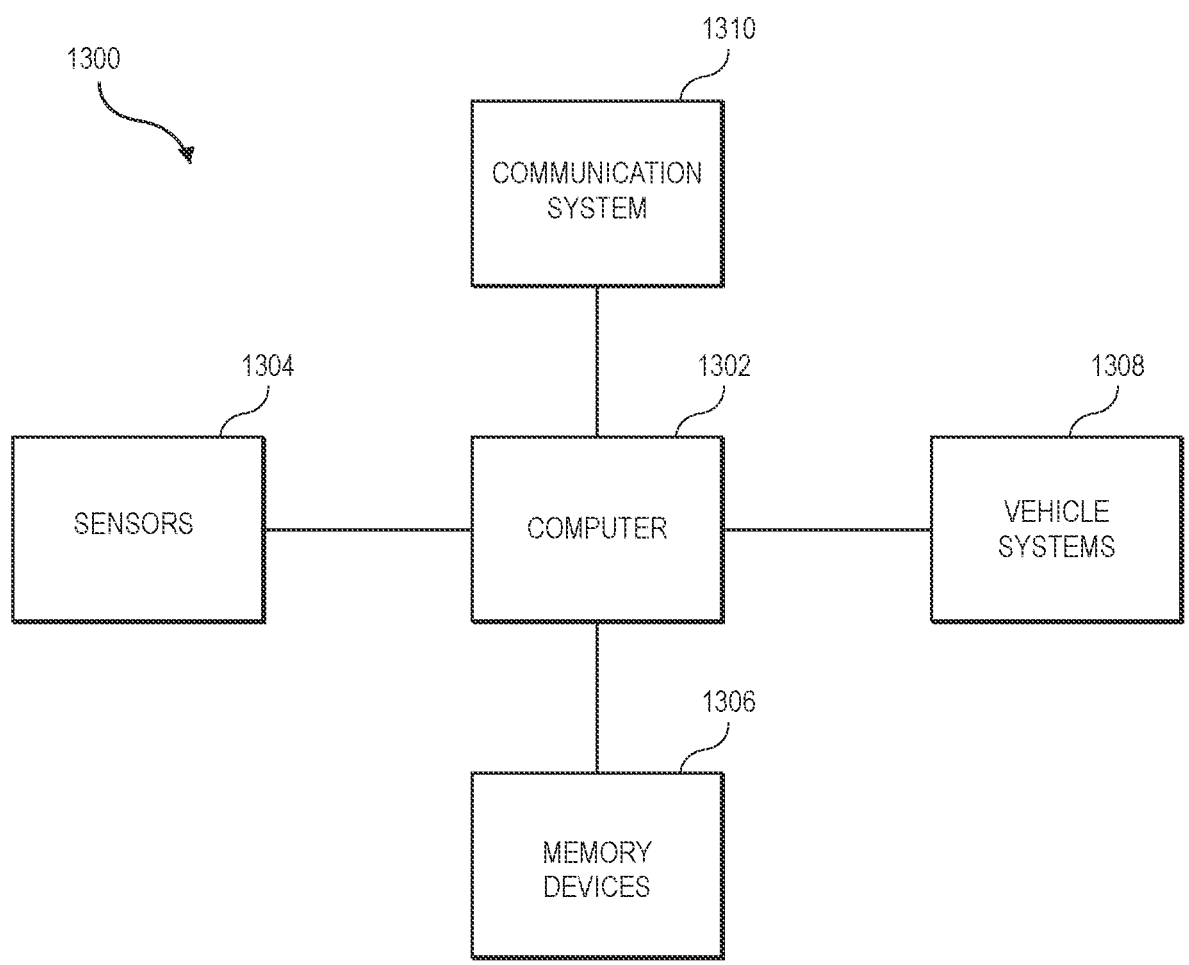
FIG. 13 illustrates example components that can be implemented within an autonomous vehicle, according to embodiments described herein.

FIG. 13 illustrates example components 1300 that can be implemented within an autonomous vehicle, according to embodiments described herein. In particular, the components 1300 may be implemented in the autonomous vehicles described throughout, such as the autonomous vehicle 1200 (FIG. 12).

The components 1300 may include a computer 1302. The computer 1302 may include one or more of the features of the computer described in relation to FIG. 12. The computer 1302 may coordinate one or more operations of the autonomous vehicle and may analyze data captured by the autonomous vehicle.

The components 1300 may further include one or more sensors 1304. The sensors 1304 may include one or more of the features of the sensors 1202. The sensors 1304 may be coupled to the computer 1302 and may provide data captured by the sensors 1304 to the computer 1302.

The components 1300 may further include one or more memory devices 1306. The memory devices 1306 may be coupled to the computer 1302. In some embodiments, the memory devices 1306 may also be coupled to the sensors 1304. The memory devices 1306 may be comprise computer-readable media. In some embodiments, the computer-readable media may be non-transitory computer-readable media. The memory devices 1306 may store one or more instructions that, when executed by the computer 1302, cause the computer 1302 to perform one or more operations described throughout this disclosure being performed by a computer implemented in an autonomous vehicle. The instructions may comprise software, where the software may be updated via one or more of the systems and/or the procedures described throughout this disclosure. Further, the memory devices 1306 may be utilized for storing data of the autonomous vehicle. For example, the computer 1302 may provide the data received from the sensors 1304 to the memory devices 1306 for storage on the memory devices 1306. Further, the memory devices 1306 may store routes associated with route planning of the autonomous vehicle, maneuvers associated with maneuver planning of the autonomous vehicle, or some combination thereof.

The components 1300 may further include one or more vehicle systems 1308. The vehicle systems 1308 may be coupled to the computer 1302 and the computer 1302 may control operation of the vehicle systems 1308. The vehicles systems 1308 may include motion systems of the autonomous vehicle, indicator systems of the autonomous vehicle, or some combination thereof. The motion systems may include a throttle system, a braking system, a steering system, or some combination thereof, of the autonomous vehicle.

The components 1300 may further include a communication system 1310. The communication system 1310 may be coupled to the computer 1302. The communication system 1310 may comprise a wireless communication system and may allow the computer 1302 to wirelessly communicate with other devices, such as a server. The communication system 1310 may implement one or more wireless communication standards, such as mobile communication standards, radar communication standards, satellite communication standards, global position system communication standards, Wi-Fi communication standards, and/or Bluetooth communication standards.

Select Examples

Example 1 may include a base for a vehicle container, comprising a body to mount to a seat of a vehicle, and an attachment element embedded within the body, the attachment element comprising a mounting element to receive a portion of the vehicle container, and wherein the mounting element is to maintain a vertical position of the portion of the vehicle container when received.

Example 2 may include the base of example 1, further comprising a mounting plate embedded within the body and located toward a first end of a surface of the body, the vehicle container to mount to the surface, the mounting plate of the base to engage with a mounting plate of the vehicle container, wherein the attachment element is located at a second end of the surface, the second end being opposite to the first end, and wherein the mounting plate of the base is to maintain a horizontal position of vehicle container when engaged with the mounting plate of the vehicle container.

Example 3 may include the base of example 2, further comprising a first clip element coupled at the first end, the first clip element to connect to a second clip element of the vehicle container, wherein the first clip element and the second clip element being connected maintains engagement of the mounting plate of the base and the mounting plate of the vehicle container.

Example 4 may include the base of example 1, wherein a surface of the body to which the vehicle container is to be mounted has an indentation, and wherein the attachment element is located adjacent to the indentation.

Example 5 may include the base of example 1, wherein the attachment element has two apertures, wherein the two apertures extend through the body from a first surface of the body to which the vehicle container is to be mounted to a second surface of the body to abut the seat, and wherein the two apertures are to have a tether to extend through the two apertures and connect to at least one anchor of the seat to mount the base to the seat.

Example 6 may include the base of example 1, wherein the body comprises a foam material, and wherein the attachment element comprises a rigid material.

Example 7 may include the base of example 6, wherein the foam material comprises expanded polypropylene.

Example 8 may include the base of example 6, wherein the rigid material comprises a plastic material.

Example 9 may include a vehicle container unit, comprising a vehicle container comprising an enclosure that encloses a space for carrying items, and a mounting mechanism for mounting the vehicle container, wherein the mounting mechanism includes an arm, and a base to mount to a seat of a vehicle, the base comprising a mounting mechanism to couple to the mounting mechanism of the vehicle container to mount the vehicle container to the base, wherein the mounting mechanism of the base includes an extension and a recess encircled by the extension, wherein the arm of the mounting mechanism is to be positioned in the recess to mount the vehicle container to the base, and wherein the extension is to maintain a vertical position of the arm when the arm is located within the recess.

Example 10 may include the vehicle container unit of example 9, wherein the extension and the recess are located toward a first end of a surface of the base, wherein the mounting mechanism of the base further includes a first clip element located toward a second end of the surface of the base, wherein the arm is located toward a first end of a surface of the vehicle container, wherein the mounting mechanism of the vehicle container further includes a second clip element located toward a second end of the surface of the vehicle container, wherein the first clip element is to connect with the second clip element, and wherein the first clip element and the second clip element are to maintain the second end of the surface of the base against the second end of the surface of the vehicle container when engaged.

Example 11 may include the vehicle container unit of example 9, wherein the enclosure includes a door, the door rotatable around a poly hinge to open and close the enclosure about the space.

Example 12 may include the vehicle container unit of example 11, further comprising a magnet embedded within the enclosure, the magnet to apply a magnetic force to the door to maintain the door in a closed position absent external forces.

Example 13 may include the vehicle container unit of example 9, further comprising a divider element coupled to the enclosure, the divider element to extend within the space and subdivide the space within the enclosure.

Example 14 may include the vehicle container unit of example 13, wherein the divider element is coupled to an inner wall of the enclosure via a poly hinge, the divider element to rotate about the poly hinge between a first position against the inner wall and a second position that subdivides the space.

Example 15 may include the vehicle container unit of example 9, wherein the enclosure comprises a foam material, and wherein the mounting mechanism of the vehicle container comprises a rigid material.

Example 16 may include the vehicle container unit of example 15, wherein the foam material comprises expanded polypropylene, and wherein the rigid material comprises a plastic material.

Example 17 may include the vehicle container unit of example 9, further comprising a tether, wherein the base further comprises an attachment element having two apertures extending from a first surface of the base to which to vehicle container is to be mounted to a second surface of the base to abut the seat, wherein the tether is to extend through the two apertures and connect to an anchor system of the seat of the vehicle to mount the base to the seat.

Example 18 may include a vehicle container to be mounted to a base of a vehicle container unit, the vehicle container comprising an enclosure that encloses a space for carrying items, an arm located at a first end of the enclosure, wherein the arm is to engage with a mounting element of a base to maintain a vertical position of the first end of the enclosure when engaged, and a first clip element located at a second end of the enclosure, the second end opposite to the first end, wherein the first clip element is to connect to a second clip element of the base to maintain the second end of the enclosure against the base when connected.

Example 19 may include the vehicle container of example 18, further comprising a divider element coupled to the enclosure via a hinge and located within the space enclosed within the enclosure, wherein the divider element is to rotate between a first position against an inner wall of the enclosure and a second position that subdivides the space.

Example 20 may include the vehicle container of example 18, wherein the enclosure comprises a foam material, and wherein the arm comprises a rigid material.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this disclosure. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

The invention claimed is:

1. A vehicle container unit for a vehicle, comprising:
a vehicle container comprising:
an enclosure having inner walls that enclose a space for carrying items;
a door rotatable around a first hinge to open and close the enclosure about the space;
a divider element in the space having a wall, the wall having a first end coupled to a top inner wall of the inner walls via a second hinge, a second end facing the door when the door closes the enclosure, a third end opposite of the first end, and a fourth end opposite of the second end, wherein;
the divider element rotates about the second hinge between two or more different positions, the two or more different positions comprising (1) a first position of the divider element corresponding to the wall positioned horizontally against the top inner wall, and (2) a second position of the divider element corresponding to the wall subdividing the space vertically into a first space and a second space within the enclosure;
the divider element includes a handle located at a corner of formed by the second end and the third end of the wall, the handle being coupled to the wall via a third hinge at the second end of the wall; and
the handle being rotatable about the third hinge to be in (1) a first position of the handle away from the wall allowing a user to rotate the divider element from the first position to the second position, and (2) a second position of the handle positioned against the wall and within the first space when the divider element is in the second position of the divider element; and a first surface, the first surface being parallel to a plane of contact of the vehicle with a surface on which the vehicle is located when the vehicle container is installed in a seating area of a passenger seat of the vehicle; and a base to mate with a seating area of the passenger seat of the vehicle, the base comprising a second surface to abut the first surface of the vehicle container.

2. The vehicle container unit of claim 1, wherein the enclosure has a first magnet and a second magnet embedded within the enclosure to maintain the divider element in the first position of divider element and in the second position of divider element respectively.

3. The vehicle container unit of claim 2, wherein the first magnet and the second magnet act with a further magnet or metal embedded within the wall of the divider element to maintain the divider element in the first position of the divider element and the second position of the divider element respectively.

4. The vehicle container unit of claim 1, wherein:
the enclosure has a first metal and a second metal embedded within the enclosure;
the divider element has a magnet embedded within the wall; and
the magnet acts with the first metal and the second metal to maintain the divider element in the first position of the divider element and the second position of the divider element.

5. The vehicle container unit of claim 1, wherein the divider element is maintained at the second position of the divider element by a weight of the divider element.

6. The vehicle container unit of claim 1, wherein the divider element is maintained at the second position of the divider element by a friction between the divider element and the enclosure.

7. The vehicle container unit of claim 1, wherein the door is maintained in a closed position by magnetic forces.

8. The vehicle container unit of claim 1, wherein the door has a handle to facilitate opening and closing of the door.

9. The vehicle container unit of claim 8, wherein the door has an indication that a user can interact with the handle.

10. A vehicle container for a vehicle, comprising:
an enclosure having inner walls that enclose a space for carrying items;
a door to enclose the space and to expose the space, coupled to the enclosure via a first hinge;
a divider element within the space having a wall, the wall having a first end coupled to a top inner wall of the inner walls via a second hinge, a second end facing the door when the door encloses the space, a third end opposite of the first end, and a fourth end opposite of the second end, wherein;
the divider element rotates about the second hinge between two or more different positions, comprising (1) a first position of the divider element corresponding to the wall positioned horizontally against the top inner wall, and (2) a second position of the divider element corresponding to the wall subdividing the space vertically into a first space and a second space within the enclosure;
the divider element includes a handle located at a corner formed by the second end and the third end of the wall; and
the handle being rotatable about the second end to be in (1) a first position of the handle corresponding to the handle extending perpendicularly from the wall, and (2) a second position of the handle corresponding to the handle abutting the wall and within the first space when the divider element is in the second position of the divider element; and a first surface, the first surface being parallel to a plane of contact of the vehicle with a surface on which the vehicle is located when the vehicle container is installed in a seating area of a passenger seat of the vehicle.

11. The vehicle container of claim 10, wherein the handle is coupled to the wall via a third hinge.

12. The vehicle container of claim 10, wherein the divider element includes a first magnet or a first metal embedded within the wall towards the third end of the wall.

13. The vehicle container of claim 10, wherein the enclosure includes a second magnet or a second metal embedded within a bottom inner wall of the inner walls of the enclosure.

14. The vehicle container of claim 10, wherein a weight of the divider element maintains the divider element in the second position of the divider element.

15. The vehicle container of claim 10, wherein a friction between the divider element and a bottom inner wall of the inner walls of the enclosure maintains the divider element in the second position of the divider element.

16. A vehicle container for a vehicle, comprising:
an enclosure having inner walls that enclose a space for carrying items;
a door to enclose the space and to expose the space, coupled to the enclosure via a first hinge;
a divider element in the space having a wall, the wall having a first end coupled to a top inner wall of the inner walls via a second hinge, a second end facing the door when the door encloses the space, and a third end opposite of the first end, and a fourth end opposite of the second end facing the inner walls of the enclosure, wherein;
the divider element rotates about the second hinge between two or more different positions comprising (1) a first position of the divider element corresponding to the wall positioned horizontally against the top inner wall, and (2) a second position of the divider element corresponding to the wall subdividing the space vertically into a first space and a second space within the enclosure;
the two or more different positions of the divider element are maintained by magnetic forces;
the divider element includes a handle located at a corner of formed by the second end and the third end of the wall; and
the handle being rotatable about the second end of the wall to be in (1) a first position of the handle corresponding to the handle being positioned away from the wall, and (2) a second position of the handle corresponding to the handle positioned flat against the wall and within the first space when the divider element is in the second position of the divider element; and a base to mate with a seating area of a passenger seat of the vehicle, the base comprising a top surface to abut a bottom surface of the vehicle container;
wherein the enclosure, the door, and the base are made from a condensable material.

17. The vehicle container of claim 2, wherein, when a force exceeding the magnetic forces that maintain the divider element in the first position of the divider element is applied to the handle, the wall rotates away from the top inner wall of the inner walls of the enclosure.

18. The vehicle container of claim 16, wherein the door is maintained in a closed position to enclose the space by magnetic forces.

19. The vehicle container of claim 16, wherein the door has a handle extending horizontally for applying a force to move the door from a closed position to an open position.

20. The vehicle container of claim 19, wherein the door has an indication that a user can interact with the handle.

* * * * *